US011291913B2

(12) United States Patent
Dorn et al.

(10) Patent No.: US 11,291,913 B2
(45) Date of Patent: Apr. 5, 2022

(54) POSITIONAL HAPTICS VIA HEAD-MOUNTED PERIPHERAL

(71) Applicant: Sony Interactive Entertainment LLC, San Mateo, CA (US)

(72) Inventors: Victoria Dorn, San Mateo, CA (US); Frank Zhao, San Mateo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 54 days.

(21) Appl. No.: 17/002,727

(22) Filed: Aug. 25, 2020

(65) Prior Publication Data

US 2022/0062766 A1 Mar. 3, 2022

(51) Int. Cl.
*A63F 13/54* (2014.01)
*A63F 13/285* (2014.01)
*H04S 7/00* (2006.01)
*G02B 27/00* (2006.01)
*A63F 13/40* (2014.01)

(52) U.S. Cl.
CPC ............ *A63F 13/54* (2014.09); *A63F 13/285* (2014.09); *A63F 13/40* (2014.09); *G02B 27/0093* (2013.01); *H04S 7/304* (2013.01)

(58) Field of Classification Search
USPC .......................................................... 463/35
See application file for complete search history.

(56) References Cited

U.S. PATENT DOCUMENTS

| 6,422,941 | B1  | 7/2002  | Thorner et al. |
| 7,803,050 | B2* | 9/2010  | Mao ...................... A63F 13/215 463/36 |
| 9,959,962 | B2* | 5/2018  | Bassett ................. H01F 7/0205 |
| 10,507,137 | B2 | 12/2019 | Dierenbach |

(Continued)

OTHER PUBLICATIONS

PCT/US2021/044567, Notification of Transmittal of the International Search Report and the Written Opinion of the International Searching Authority, or the Declaration, PCT/ISA/220, and the International Search Report, PCT/ISA/210, Nov. 22, 2021.

*Primary Examiner* — Pierre E Elisca
(74) *Attorney, Agent, or Firm* — Penilla IP, APC

(57) ABSTRACT

Methods and systems are provided for activating a plurality of haptic sensors of a physical headset of a user playing a video game. The method includes detecting a sound component associated with an audio object in a scene of the video game, the audio object having a three-dimensional (3D) location in the scene. The method includes identifying position and orientation of a character of the user in the scene in relation to the 3D location of the audio object. The character of the user being controlled by the user playing the video game. The method includes associating a virtual headset to a head of the character, the virtual headset moving as the position and orientation of the character moves in the scene. The virtual headset including a plurality of virtual haptic sensors. The method includes applying a magnitude to each of the plurality of haptic sensors of the physical headset based on a directional distance of each of the virtual haptic sensors of the virtual headset to the audio object in the (Continued)

scene. In one example, in addition to magnitude, frequency and audio data related to the audio object is usable as inputs for controlling each of the plurality of haptic sensors.

22 Claims, 10 Drawing Sheets

(56) References Cited

U.S. PATENT DOCUMENTS

| | | | |
|---|---|---|---|
| 10,569,165 B2 | 2/2020 | Jones | |
| 2017/0200544 A1* | 7/2017 | Bassett | H01F 7/206 |
| 2018/0078422 A1* | 3/2018 | Dierenbach | A63F 13/285 |
| 2018/0093181 A1* | 4/2018 | Goslin | A63F 13/212 |
| 2020/0054490 A1* | 2/2020 | Dierenbach | H04R 25/402 |
| 2020/0174553 A1 | 6/2020 | Jones et al. | |
| 2020/0175761 A1 | 6/2020 | Jones et al. | |
| 2020/0368616 A1* | 11/2020 | Delamont | A63F 13/25 |
| 2021/0327142 A1 | 10/2021 | Jones et al. | |

* cited by examiner

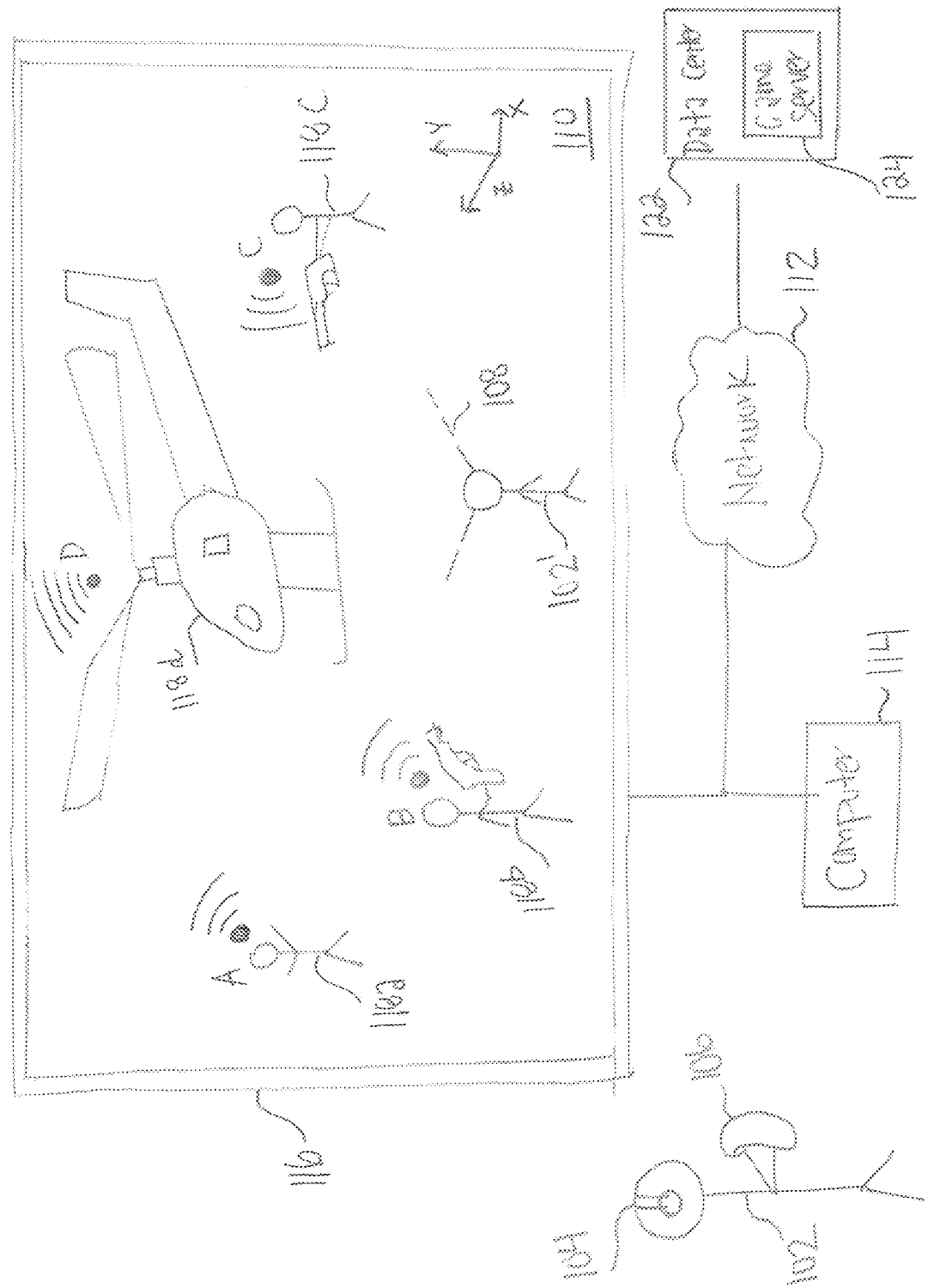

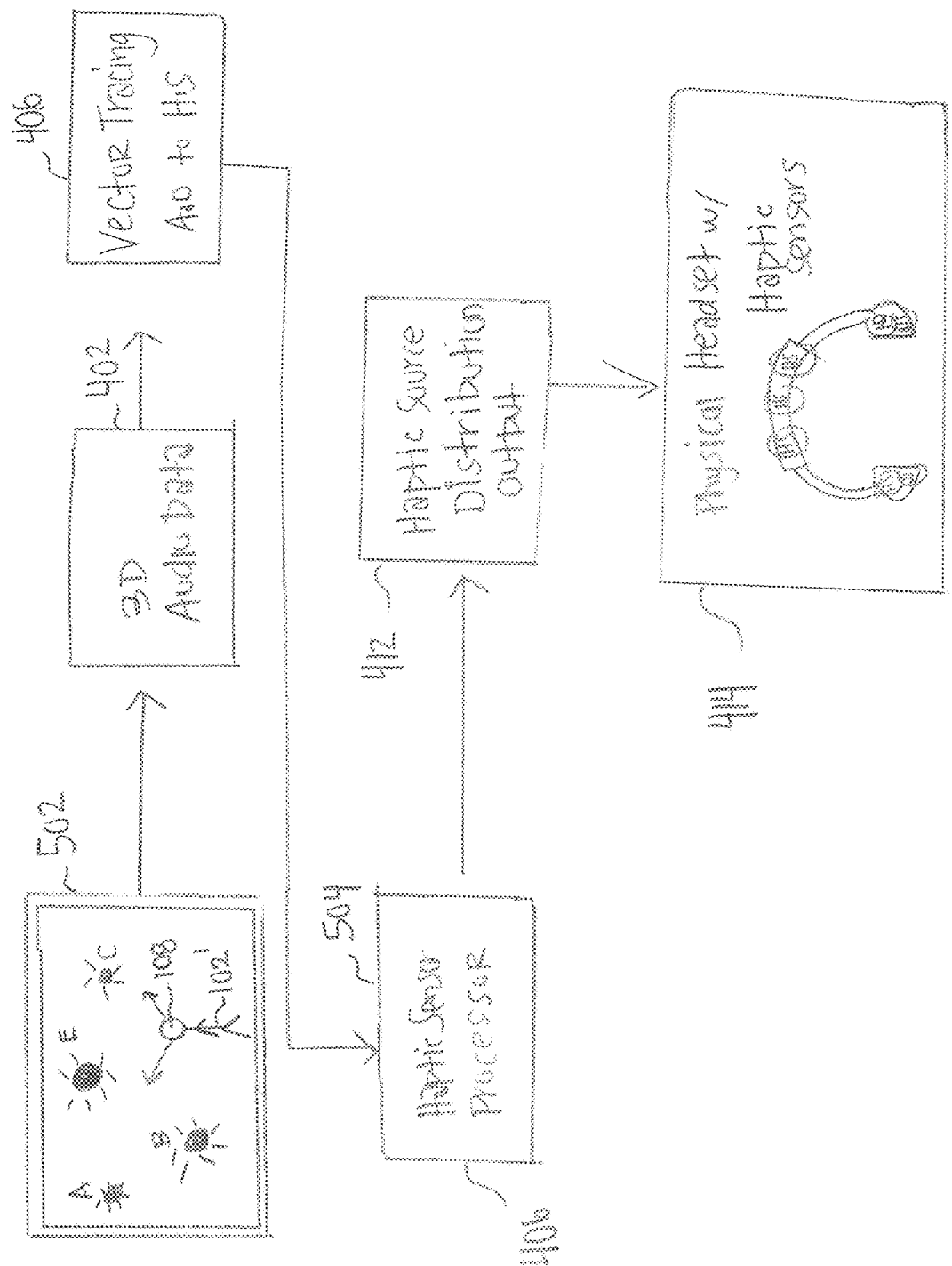

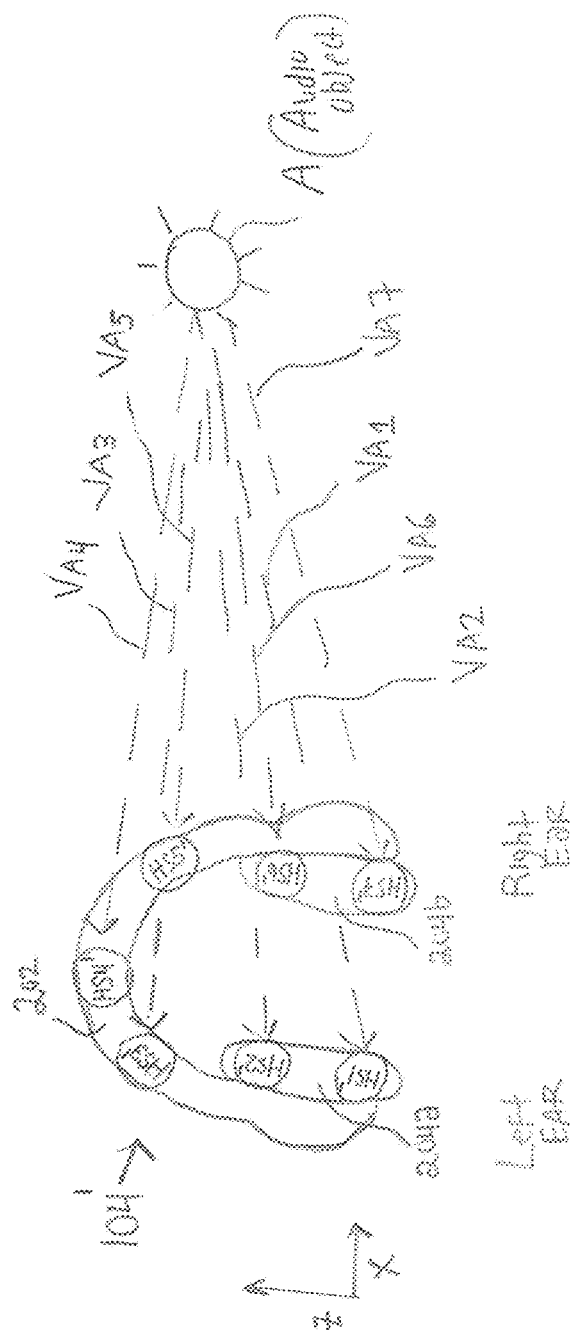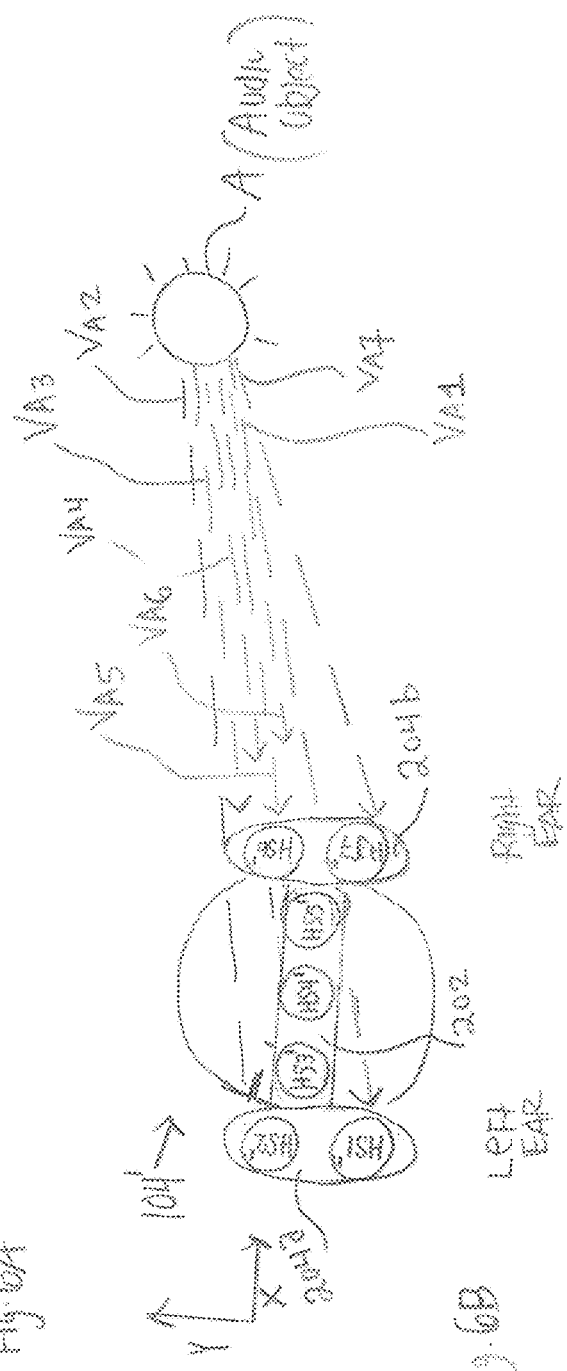

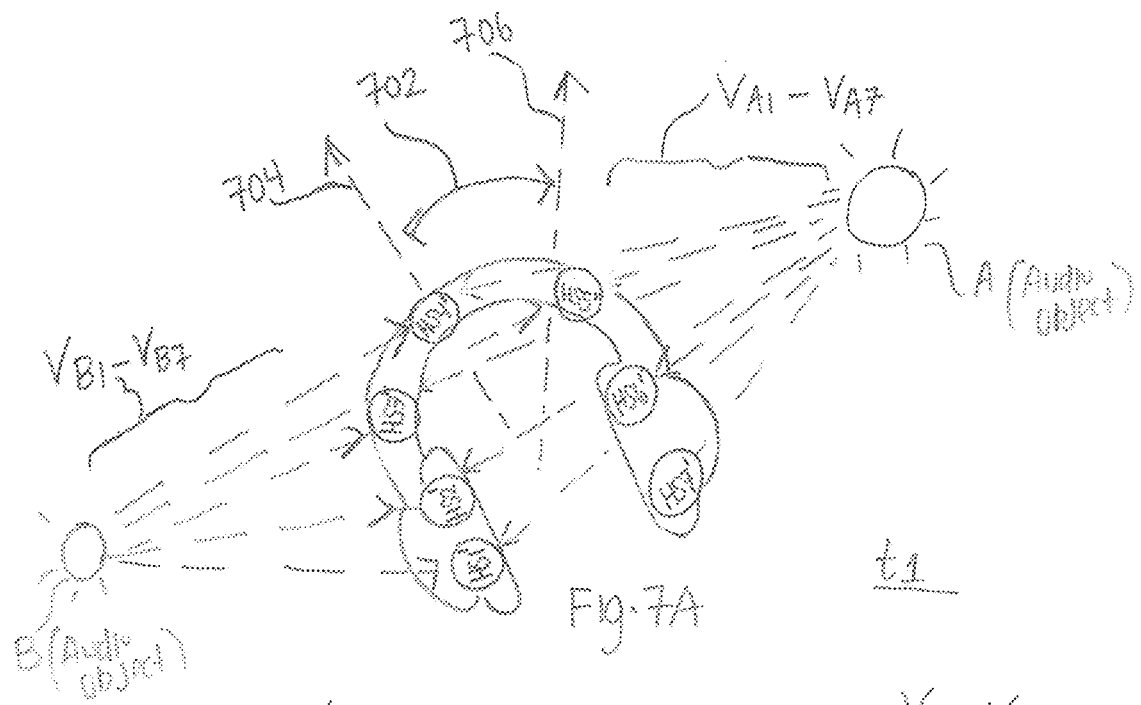
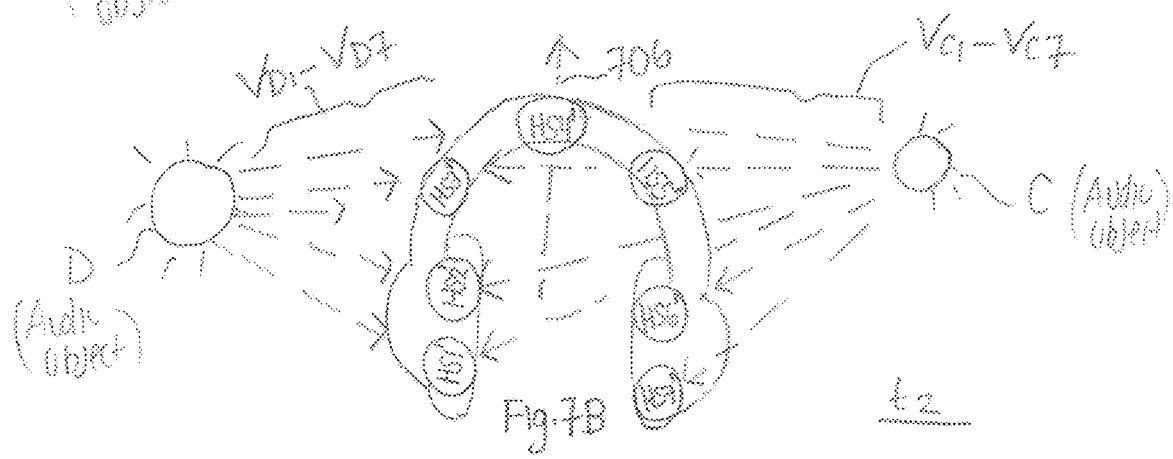
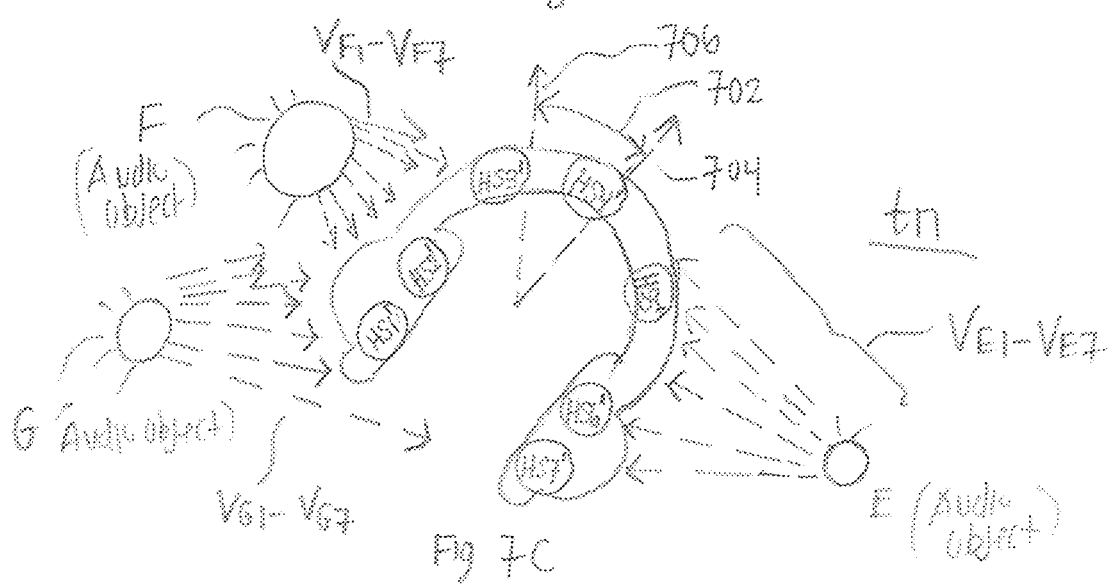

| Haptic Sensor | Haptic Sensor Magnitude Table | | | | | | | | | | | | | Personal weighting adjustment | | |
|---|---|---|---|---|---|---|---|---|---|---|---|---|---|---|---|---|
| | Haptic Sensor Magnitude | | | | | | | | | | | | | Setting 1 | Setting 2 | Setting 3 |
| | Time | | | | | | | | | | | | | | | |
| | t1 | t2 | t3 | t4 | t5 | t6 | t7 | t8 | t9 | t10 | t11 | t12 | t13 | | | |
| HS1 | 1.22 | 1.24 | 1.44 | 1.31 | 1.83 | 1.72 | 1.60 | 1.63 | 0.32 | 1.13 | 1.43 | 2.46 | 3.57 | 1 | 0.5 | 1 |
| HS2 | 0.29 | 0.11 | 1.51 | 1.99 | 2.98 | 3.01 | 3.95 | 4.44 | 4.67 | 6.89 | 7.44 | 7.32 | 3.69 | 1 | 0.5 | 1 |
| HS3 | 4.89 | 7.82 | 5.12 | 1.77 | 8.96 | 9.86 | 9.18 | 9.39 | 4.72 | 2.51 | 1.64 | 1.18 | 0.83 | 1 | 0.5 | 1 |
| HS4 | 1.18 | 1.84 | 1.08 | 1.23 | 2.01 | 2.11 | 2.33 | 2.39 | 2.47 | 0.00 | 0.00 | 0.00 | 0.00 | 1 | 0.5 | 1 |
| HS5 | 0.96 | 0.83 | 0.89 | 1.10 | 2.89 | 2.33 | 0.64 | 0.80 | 0.00 | 0.46 | 0.00 | 0.00 | 0.00 | 0 | 1 | 2 |
| HS6 | 0.12 | 0.00 | 0.17 | 6.28 | 0.00 | 0.00 | 0.00 | 0.00 | 0.88 | 0.92 | 0.00 | 0.00 | 0.00 | 0 | 1 | 2 |
| HS7 | 4.44 | 8.52 | 9.67 | 3.88 | 7.60 | 8.97 | 3.34 | 1.36 | 0.00 | 0.87 | 1.05 | 1.95 | 0.13 | 0 | 0 | 2 |
| HS8 | 0.00 | 0.00 | 0.00 | 0.00 | 0.00 | 0.00 | 0.00 | 0.00 | 0.00 | 0.00 | 0.00 | 0.00 | 0.00 | 0.5 | 0.5 | 1 |
| HS9 | 0.00 | 0.00 | 0.19 | 0.01 | 1.14 | 1.11 | 1.15 | 2.24 | 2.28 | 2.56 | 2.39 | 2.29 | 2.28 | 0.5 | 0.5 | 1 |
| HS10 | 0.00 | 0.00 | 1.74 | 5.56 | 0.00 | 0.00 | 0.00 | 0.00 | 0.00 | 0.13 | 0.00 | 0.00 | 0.00 | 0.5 | 0.5 | 1 |
| HS11 | 0.00 | 0.00 | 1.83 | 5.56 | 0.00 | 0.00 | 0.00 | 0.00 | 0.00 | 0.00 | 0.00 | 0.00 | 0.00 | 0.5 | 0.5 | 1 |

Fig. 9

POSITIONAL HAPTICS VIA HEAD-MOUNTED PERIPHERAL

BACKGROUND

1. Field of the Disclosure

The present disclosure relates generally to augmenting a headset of a player during gameplay, and more particularly to methods and systems for activating a plurality of haptic sensors of a headset of the player during the gameplay of the player.

2. Description of the Related Art

The video game industry has seen many changes over the years and has been trying to find ways to enhance a player's gaming experience so that engagement by the player is increased or maintained. An increase in a player's engagement level in video games can result in higher retention levels and an increase in video game revenue. To this end, developers have been seeking ways to develop sophisticated operations to enhance a player's gaming experience.

A growing trend in the video game industry is the advancement in audio headset technology and improvements in immersive audio experiences in video games. Advancements in headset technology can enhance a player's gaming experience in several ways such as providing situational awareness, creating a three-dimensional audio perception experience, creating a visceral emotional response, intensifying gameplay actions, etc. Unfortunately, current headsets are limited and may not allow players to fully spatially localize the audio from video games or other media content. Consequently, a player may be missing an entire dimension of an engaging gaming experience.

It is in this context that implementations of the disclosure arise.

SUMMARY

Implementations of the present disclosure include methods, systems, and devices relating to activating a plurality of haptic sensors of a physical audio headset of a user playing a video game. In some embodiments, methods are disclosed that enable select ones of the haptic sensors of a physical headset of a user to vibrate in response to sound components from a video game when the haptic sensors are activated. This augments the user's overall gaming experience by allowing the user to spatially localize interactive content from video games when the haptic sensors vibrate. For example, an audio object in a video game scene may produce a sound of a bomb exploding. The explosion can result in the activation of one or more of haptic sensors of the headset of the user which in turn can cause the one or more of haptic sensors to vibrate at an intensity that corresponds to the explosion. The haptic sensors vibrate using motors that are tuned to specific magnitudes and frequencies. In some embodiments, the three-dimensional (3D) location of the audio objects and a character user in the video game are tracked and monitored throughout the gameplay. Using the 3D location of the audio objects and the character user, vector tracing is used to determine the directional distance of the audio objects to a virtual haptic sensor of the user character. In some embodiments, the magnitude applied to each of the haptic sensors of the physical headset of the user is based on the directional distance determined during vector tracing.

In one configuration, using vector based amplitude panning, it is possible to "virtually" position haptic vibrations around the user's head to augment or provide additional cues for a normal or hearing impaired player so that they can better spatially localize different sound omitting game objects. In HMD related configurations, providing haptics that mimic spatial activity in a VR space is also enabled. By way of example, each haptic object or event is capable of delivering a vector, but it is possible to combine 2, 3, 4 o'clock together to change magnitude, and the centroid can be coming from a center of the head and going in and out. In one example, it is possible to enables application of different magnitudes to different located haptic sensors to create a phantom source between at least three activated haptic sensors/motors.

Thus, the way in which different haptic sensors are activated (and the magnitude/frequency), it is possible to provide combined haptic effects that mimic the three-dimensional nature of audio objects presented in a scene. In one embodiment, the effects enabled with three-dimensional audio combined with three-dimensional haptic activation provide for a live-like realistic experience not provided before.

In one embodiment, a method for activating a plurality of haptic sensors of a physical headset of a user playing a video game is provided. The method includes detecting a sound component associated with an audio object in a scene of the video game, the audio object having a three-dimensional (3D) location in the scene. The method includes identifying position and orientation of a character of the user in the scene in relation to the 3D location of the audio object. The character of the user being controlled by the user playing the video game. The method includes associating a virtual headset to a head of the character, the virtual headset moving as the position and orientation of the character moves in the scene. The virtual headset including a plurality of virtual haptic sensors. The method includes applying a magnitude to each of the plurality of haptic sensors of the physical headset based on a directional distance of each of the virtual haptic sensors of the virtual headset to the audio object in the scene.

In another embodiment, a headset for a user when playing a video game is disclosed. The headset includes a left ear portion and a right ear portion. The left and right ear portions include an audio output section and a surround section. The headset includes a plurality of haptic sensors disposed around each of the surround sections of the left ear portion and the right ear portion. The headset includes a left ear pad covering the first plurality of haptic sensors and a right ear pad covering the second plurality of haptic sensors. The headset includes a controller connected to each of the plurality of haptic sensors. The controller is configured to receive control data to be sent to each of the plurality of haptic sensors for setting a magnitude output by each of the plurality of haptic sensors. The magnitude output is set by detecting a sound component associated with an audio object in a scene of the video game. The audio object having a three-dimensional (3D) location in the scene. The magnitude output is set by identifying position and orientation of a character of the user in the scene in relation to the 3D location of the audio object. The character of the user being controlled by the user playing the video game. The magnitude output is set by associating a virtual headset to a head of the character, the virtual headset moving as the position and orientation of the character moves in the scene, the virtual headset including the plurality of virtual haptic sensors. The magnitude output is set by applying the magnitude to each of the plurality of haptic sensors of the headset based on a directional distance of each of the virtual haptic sensors of the virtual headset to the audio object in the scene.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may be better understood by reference to the following description taken in conjunction with the accompanying drawings in which:

FIG. 1 illustrates an embodiment of a system configured to execute a gameplay of a user playing a video game and to activate a plurality of haptic sensors of a headset of the user in response to a plurality of audio objects in a scene in the video game, in accordance with an implementation of the disclosure.

FIG. 5 shows a conceptual illustration of an additional embodiment of a method for activating a plurality of haptic sensors of a headset of a user using audio data from a scene of a video game, in accordance with an implementation of the disclosure.

FIGS. 6A and 6B show conceptual illustrations of an embodiment showing the relationship between an audio object and a virtual headset of a character user during vector tracing, in accordance with an implementation of the disclosure.

FIGS. 7A-7C show conceptual illustrations of an embodiment showing the relationship between a plurality of audio objects and a virtual headset during vector tracing at various points in time, in accordance with an implementation of the disclosure.

FIG. 9 illustrates an embodiment of a haptic sensor magnitude table which includes the respective magnitudes that are applied to each of the haptic sensors of a headset of a user during the gameplay of the user, in accordance with an implementation of the disclosure.

DETAILED DESCRIPTION

Figure 2A:
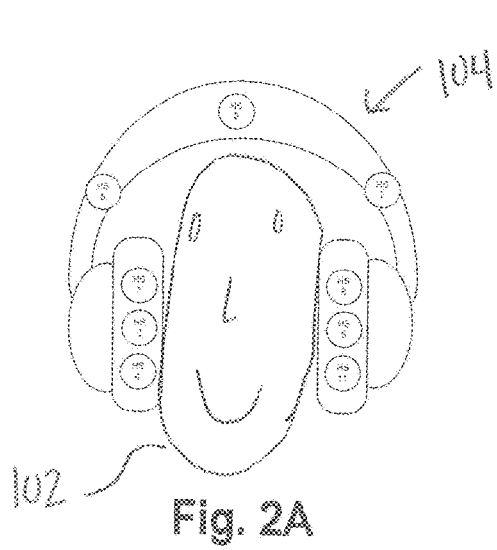
FIGS. 2A and 2B illustrate an embodiment of a user using a headset and a plurality of haptic sensors located at various locations along the headset, respectively, in accordance with an implementation of the disclosure.

The following implementations of the present disclosure provide methods, systems, and devices for activating a plurality of haptic sensors of a physical audio headset of a user playing a video game. In one embodiment, when the haptic sensors of the physical headset of a user are activated, select ones of the haptic sensors vibrate in response to sound components from the video game. This augments the user's overall gaming experience by helping the user better localize audio from the video game with the use of the haptic sensors. In particular, the present disclosure detects sound components associated with audio objects in a scene of a video game. In one embodiment, the present disclosure also identifies the position and orientation of a user character in a video game scene. Using the three-dimensional (3D) location data of the audio objects and the position and orientation data of the user character, vector tracing can be performed to determine the respective magnitudes to apply to each haptic sensor of the physical headset of the user. The magnitude applied to each haptic sensor of the physical headset of the user can result in haptic vibrations at the haptic sensors which augments the user's gameplay audio and provides an enhanced gaming experience.

By way of example, in one embodiment, a method is disclosed that enables activating a plurality of haptic sensors of a physical audio headset of a user playing a video game. The method includes detecting a sound component associated with an audio object in a scene of the video game. The audio object has 3D location data in the scene. In one embodiment, the method may further include identifying position and orientation of a character of the user in the scene in relation to the 3D location of the audio object in the scene. The character of the user may be controlled by the user playing the video game. In another embodiment, the method may include associating a virtual headset (e.g., virtual representation of a physical audio headset of a user) to a head of the character of the user. The virtual headset is a virtual representation of an audio headset that is used by the user during the gameplay. The virtual headset moves as the position and orientation of the character of the user moves in the scene. The virtual headset may include a plurality of virtual haptic sensors. In one embodiment, the method includes applying a magnitude to each of the plurality of haptic sensors of the physical headset based on a directional distance of each of the virtual haptic sensors of the virtual headset to the audio object in the scene. It will be obvious, however, to one skilled in the art that the present disclosure may be practiced without some or all of the specific details presently described. In other instances, well known process operations have not been described in detail in order not to unnecessarily obscure the present disclosure.

In accordance with one embodiment, a system is disclosed for activating a plurality of haptic sensors of an audio headset of a user while playing a video game. In one embodiment, the system includes a connection to a network. The user may be using a headset while playing a video game which can provide the user with a realistic auditory experience of the video game. In some embodiments, one or more data centers and game servers can execute the game and enable connections to users when hosting the video game. The one or more game servers of the one or more data centers may be configured to receive, process, and execute data from a plurality of devices controlled by users. In one embodiment, the headset may be audio headphones or a head-mounted display (HMD) and is configured to receive audio from the video game. The headset may include a plurality of haptic sensors dispersed at various locations along the headset and the haptic sensors can be configured to dynamically activate in response to the audio objects occurring in a video game.

In accordance with another embodiment, a magnitude may be applied to each of the plurality of haptic sensors of the headset when activated. In one embodiment, vector tracing can be used to determine the respective magnitudes to apply to each of the plurality of haptic sensors. A scene in a video game may include audio objects that can produce a corresponding sound component. In one embodiment, vector tracing may involve tracing from an audio object in a scene to a corresponding virtual haptic sensor of the virtual headset. In some embodiments, vector tracing can be used to determine the directional distance of each virtual haptic sensor of the virtual headset to the audio object in the scene, which in turn can be used to control the magnitude to apply to each of the haptic sensors. With the above overview in mind, the following provides several example figures to facilitate understanding of the example embodiments.

FIG. 1 illustrates an embodiment of a system configured to execute a gameplay of a user 102 playing a video game and to activate a plurality of haptic sensors of a headset of the user 102 in response to a plurality of audio objects in a scene in the video game. In one embodiment, FIG. 1 illustrates a user 102, a network 112, a computer 114, a display 116, a data center 122, and a game server 124. In one configuration, the user 102 is shown playing a video game using a controller 106 and is viewing a display 116. The display 116 may be connected to a computer 114 for connection to the data center 122 and the with game server 124 through the network 112. The system of FIG. 1 may be referred to as a cloud gaming system, where multiple data centers 122 and game servers 124 may work together to provide wide access to players and users 102 in a distributed and seamless fashion. In another embodiment, the computer 114 may be a game console that enables local game play execution, with connection to one or more servers of the data center 122.

In some embodiments, the user 102 can be playing a video game in front of the display 116 using the controller 106 which provides input to the video game. A computer 114 is connected to the display 116 through a wired connection or a wireless connection. The computer 114 may be a game console, a PC, a plug-in stick, or the like. According to the embodiment shown, the computer 114 can communicate with the data center 122 and the game server 124 through network 112. The computer 114 can be configured to send game commands to the data center 122 and the game server 124 through the network 112. In one embodiment, the computer 114 can be configured to receive encoded video streams (e.g., compressed) and decode the video streams received by the data center 122 and the game server 124. In some embodiments, the video streams may be presented to user 102 on the display 116 and/or a separate device such as the monitor or television. In some embodiments, the devices of the users can be any connected device having a screen and internet connections.

In one example, according to the embodiment shown in FIG. 1, the user 102 is shown using a headset 104 while playing a video game in front of the display 116. As shown on the display 116, the gameplay of the user 102 shows a scene 110 that illustrates war battle scene. As illustrated in the scene, a user character 102' is shown approaching enemy characters (e.g., audio object 118a-118d) and a helicopter (e.g., audio object 118d) is shown flying in the air. During the gameplay, the user 102 can control the various movements and actions of the user character 102' and the user character 102' may have a field of view (FOV) 108 which may be the same viewpoint that is observed by the user 102. In some cases, different camera views may be provided as options to switch to, instead of just the FOV 108. In some embodiments, the audio objects 118a-118d can produce a corresponding sound component (e.g., A-D) that can be detected by the system. Throughout the progression of the gameplay of the user 102, the system can automatically detect the various sound components produced by the corresponding audio objects and determine its three-dimensional (3D) location in the scene 110. In another embodiment, the system can automatically identify the position and orientation of the user character 102' within the scene 110. Accordingly, the position and orientation of the user character 102' in relation to the audio objects in the scene can be determined at any given point in time in the gameplay.

In some embodiments, the system can associate a virtual headset to a head of the user character 102'. The virtual headset is a virtual representation of a physical headset 104 that is used by the user 102 during the gameplay. As the position and orientation of the user character 102' moves in the gameplay, the virtual headset moves along with the user character 102'. In some embodiments, the virtual headset may include a plurality of virtual haptic sensors dispersed at various locations along the virtual headset. The virtual headset, in one embodiment, is not a visible object in the game. The virtual headset is a virtual representation of a headset, depicting the head and ears of the character 102' in the scene, relative to audio objects. In one embodiment, when a sound component is produced by an audio object, vector tracing may be used to determine the magnitude that may be applied to each of the plurality of haptic sensors on the real headset 104 of the user 102. Accordingly, audio objects in a scene of a video game can result in a magnitude being applied to the haptic sensors of a real headset which results in the activation of the haptic sensors. As a result, activation of the haptic sensors, at specific magnitudes, causes haptic vibrations to occur at the haptic sensors which augments the audio in the gameplay and allows the user to spatially localize the various sound components emitted by the audio objects in the game.

Figure 2B:
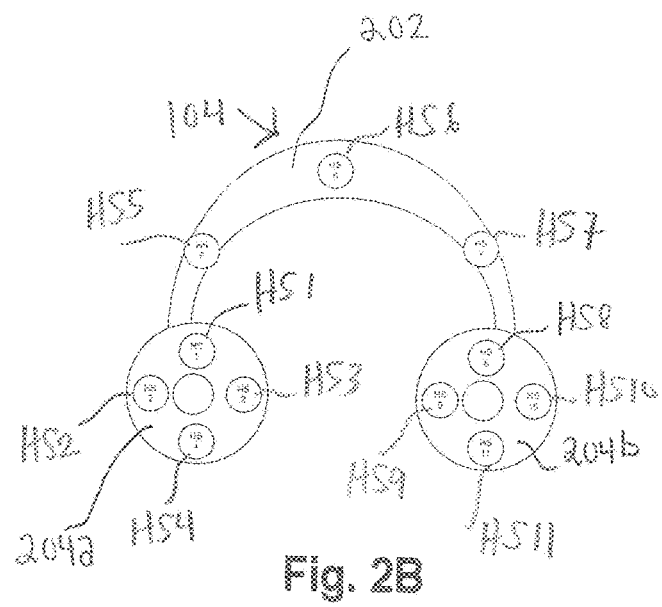

FIGS. 2A and 2B illustrate an embodiment of a user 102 using a headset 104 and a plurality of haptic sensors located at various locations along the headset 104, respectively. In some embodiments, the headset 104 may include a plurality of haptic sensors HS1-HSN that are placed at various locations along the headset 104. In one embodiment, when the haptic sensors HS1-HSN are activated, the haptic sensors may vibrate at select magnitudes and/or frequencies, which enhances the user's ability to spatially localize various sound components associated with audio objects in a video game. As illustrated in FIG. 2A, the user 102 is shown using the headset 104. FIG. 2B provides a detailed view of the headset 104 and an example illustrating the location of the haptic sensors. Each of the haptic sensors HS1-HSN may be configured to have specific shapes, and can be configured to have the same or different size. In one embodiment, the haptic sensors may be linear actuators, piezoelectric actuators, or bone conduction actuators. In some embodiments, a magnitude may be applied to each of the plurality of haptic sensors HS1-HSN and the magnitude can be generated using vector tracing from the audio object in the scene of the video game to each of the virtual haptic sensors on the virtual headset of the user character.

In one embodiment, the headset 104 may include a left ear portion and a right ear portion. In some embodiments, the left ear portion and the right ear portion each includes an audio output section and a surround section. In one embodiment, a plurality of haptic sensors are disposed around each of the surround sections of the left ear portion and the right ear portion. In some embodiments, the headset 104 may include a left ear pad covering the plurality of haptic sensors of the left ear portion and a right ear pad covering the plurality of haptic sensors of the right ear portion. In accordance with another embodiment, the headset 104 may include a controller that is connected to each of the plurality of haptic sensors. In one embodiment, the controller can be configured to receive control data to be sent to each of the plurality of haptic sensors for setting a magnitude and/or frequency output by each of the plurality of haptic sensors.

Referring to FIG. 2B, in one example, the headset 104 may include a headband 202, a left ear pad 204*a*, and a right ear pad 204*b*. In the example shown, a total of eleven haptic sensors are dispersed throughout the headset 104. As shown, the left ear pad 204*a* includes haptic sensors HS1-HS4 that are dispersed within the left ear pad 204*a*. The right ear pad 204*b* includes haptic sensors HS8-HS11 that are dispersed within the right ear pad 204*b*. The headband 202 of the headset 104 includes haptic sensors HS5-HS7 that are dispersed along the headband 202. As noted above, when the plurality of haptic sensors HS1-HSN are activated, it can enhance the user's ability to spatially localize various sound components associated with audio objects in a video game resulting in an augmented user perception of the video game.

Figure 3A:
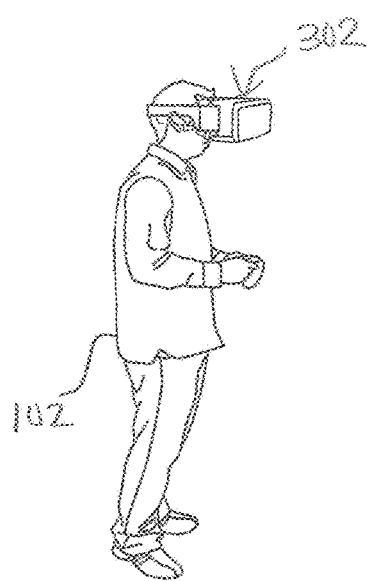
FIGS. 3A and 3B illustrate a user using a head-mounted display (HMD) and a plurality of haptic sensors located at various locations along the HMD, respectively, in accordance with an implementation of the disclosure.
Figure 3B:
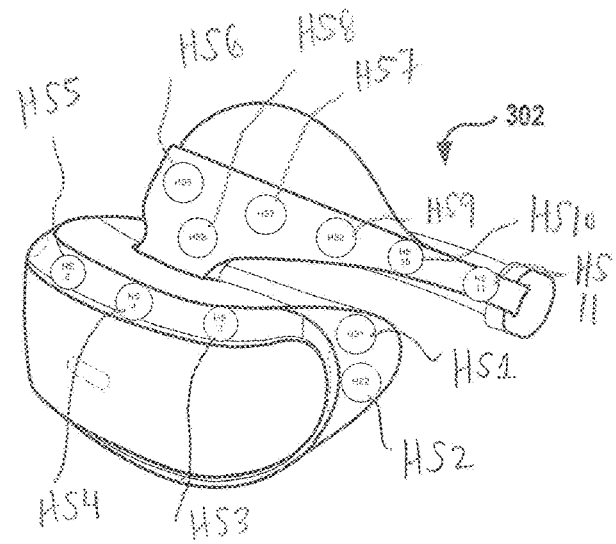

FIGS. 3A and 3B illustrate a user 102 using a head-mounted display (HMD) 302 and a plurality of haptic sensors HS1-HSN located at various locations along the HMD 302, respectively. FIG. 3A illustrates an example of a user 102 using the HMD 302 while playing a virtual reality game. FIG. 3B is an example illustrating the location of the haptic sensors along the HMD 302. Each of the haptic sensors may be configured to have specific shapes, and can be configured to have the same or different size. In one embodiment, the each of the haptic sensors may be configured to activate in response to various sound components associated with audio objects in a virtual reality video game played by the user 102. In some embodiments, a magnitude may be applied to each of the plurality of haptic sensors. The magnitude applied to each haptic sensor may vary and the magnitude can be set based on vector tracing from the audio object in the scene of the video game to each of the virtual haptic sensors on the virtual headset of the user character. In some embodiments, in addition to setting specific magnitudes, the haptic sensors can provide for varying frequency settings or dynamic frequency variations over time.

In one example, a total of 20 haptic sensors can be located at various locations along the HMD. As illustrated in FIG. 3B, haptic sensors HS1-HS2 are arranged on the left-side housing surface of the HMD 302. In some embodiments, haptic sensors HS12-HS13 (not shown) may be arranged on the right-side housing surface of the HMD 302. Haptic sensors HS3-HS5 are arranged on the upper front housing surface of the HMD 302. Haptic sensors HS6-HS8 are arranged along the front mounting band of the HMD 302. In some embodiments, haptic sensors HS9-HS11 and HS14-17 (not shown) may be arranged along the left and right section of the mounting band, respectively. In some embodiments, HS18-20 (not shown) may be arranged along the rear mounting band of the HMD 302. As noted above, when the plurality of haptic sensors HS1-HS20 are activated, the haptic sensors can enhance the user's ability to spatially localize various sound components associated with audio objects in a virtual reality video game resulting in an augmented user perception of the video game.

Figure 4:
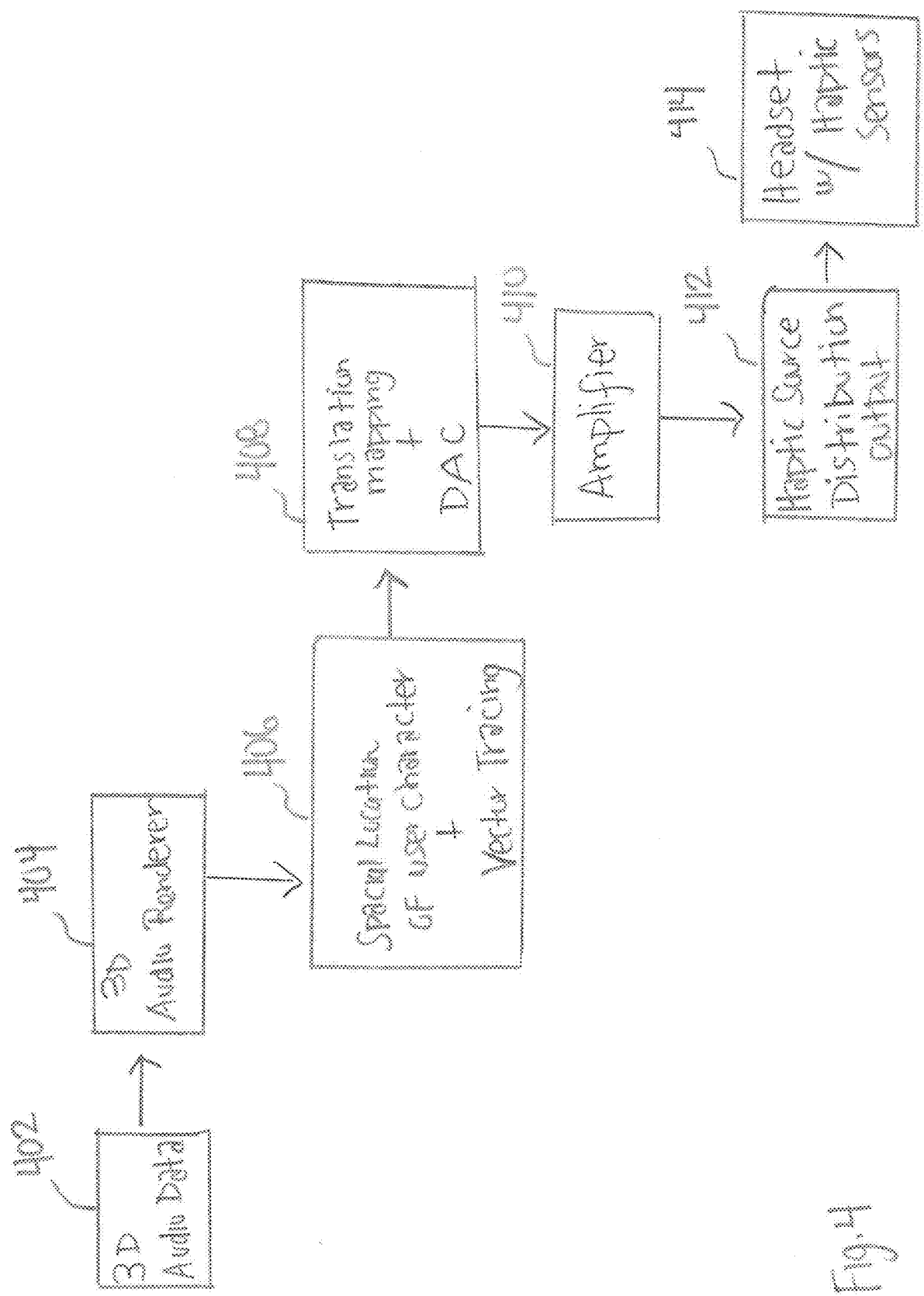
FIG. 4 an embodiment illustrating a method for activating a plurality of haptic sensors of a headset of a user based on 3-dimensional (3D) audio data from a scene of a video game, in accordance with an implementation of the disclosure.

FIG. 4 illustrates an embodiment illustrating a method for activating a plurality of haptic sensors of a headset 104 of a user 102 based on 3-dimensional (3D) audio data from a scene of a video game. In one example, the method includes an operation that is configured to access 3D audio data 402 from a video game played by the user 102. In some embodiments, the 3D audio data 402 may be accessed from media content that the user may be viewing such as a video game, a movie, broadcast television, television commercial, etc. In one embodiment, the 3D audio data 402 may include sound components that are associated with audio objects 118 from a video game scene or other media content. Each audio object 118 may have three-dimensional (3D) location data, e.g., x, y, z spatial coordinates, so that the position and orientation of each audio object can be continuously tracked and monitored throughout the gameplay.

In another embodiment, the method may further include a 3D audio renderer 404 operation that is configured to process the 3D audio data 402. In some embodiments, the 3D audio renderer 404 operation can receive the 3D audio data 402 as an input and be configured to render the audio data to determine the 3D coordinates of each audio object 118 in a scene of the video game. In some embodiments, the 3D audio renderer 404 can also be configured to track the location of the audio objects at any point in time as the video game progresses. For example, referring to FIG. 1, at time t1, audio objects 118*a*, 118*b*, 118*c*, and 118*d*, produces sound components A, B, C, and D, respectively. Using the 3D audio data, the 3D audio renderer 404 operation can determine the 3D coordinates of the audio objects at time t1. As the game progresses to time tn, the audio objects may move to a different location and the 3D audio renderer 404 operation can determine the 3D coordinates of the audio objects at their present location.

In another embodiment, the method may further include an operation 406 that is configured to determine the position and orientation of the user character 102' and to perform vector tracing from the audio objects in the scene to each virtual haptic sensor of a virtual headset of the user character 102'. In one embodiment, the audio data 402 may include the position and orientation of the user character 102'. Consequently, operation 406 can determine whether the 3D audio data 402 includes the position and orientation of the user character 102'. If it does not, operation 406 can proceed to determine the position and orientation of the user character 102'. In some embodiments, as the user 102 is playing the video game, the user 102 controls the various movements and actions of the user character 102' and the user 102 has a viewpoint of the video game from the perspective of the user character 102'. The position and orientation of the user character 102' is continuously monitored and tracked by the operation 406. At any point in time, the position and orientation of the user character 102' can be determined. For example, the position and orientation can be sampled at a programmable interval, e.g., at programmable fractions of a second, or every second, or every two seconds, or every 3 seconds, or every 4 seconds, or every five seconds, or every 10 seconds, or continuously. Accordingly, since the 3D location of each audio object in the scene of the video game is determined, operation 406 can identify the position and orientation of the user character 102' in the scene in relation to the 3D location of each audio object in the scene of the video game. The position and orientation data may be six axis data, e.g., positional components of x, y, z, and orientation components of pitch, roll and yaw, or just positional components.

In some embodiments, a virtual headset can be associated to a head of the user character 102'. The virtual headset may include a plurality of virtual haptic sensors located at various locations along the virtual headset. In one embodiment, the virtual headset is a virtual representation of a physical headset 104 of the user 102. In one embodiment, since the position and orientation of the user character 102' is tracked, the virtual headset can move along with the user character 102' as the user character 102' moves and changes position throughout gameplay. Accordingly, using the position and orientation of the user character 102' and the virtual headset, operation 406 can be configured to perform vector tracing from the audio objects in the scene of the video game to each of the virtual haptic sensors of the virtual headset of the user character 102'.

In some embodiments, vector tracing can be used to determine a magnitude to apply to each of the plurality of haptic sensors (e.g., HS1-HSN) of the headset 104 of the user 102. During vector tracing, the sound component associated with an audio object may be represented by a one or more sound vectors pointing from the audio object towards the direction of a corresponding virtual haptic sensor of the virtual headset. Each sound vector may be defined by a magnitude and direction, and the sound vectors can be used to determine the magnitude to apply to a particular haptic sensor (e.g., HS1-HSN). In some embodiments, when a scene includes a plurality of audio objects, vector tracing can be performed simultaneously for all of the audio objects in the scene. Accordingly, the magnitude applied to each haptic sensor can take into account multiple audio objects that may be in a given scene. Vector tracing is discussed in greater detail below with reference to FIGS. 6A-6B and 7A-7C. However, broadly speaking, vector tracing in this context refers to identifying a direction and magnitude of an audio object relative to a virtual haptic sensor. If a first virtual haptic sensor is facing away from the audio object, and a second haptic sensor is directly facing the audio object, the vector tracing will identify the virtual distances. The virtual distances may be used to set a programmable magnitude of the response desired from the respective virtual haptic sensors. The response of the virtual haptic sensors are then translated to the real haptic sensors on the real headset of the real user 102. Of course, as the virtual player 102' moves around, the vector tracing is updated and corresponding changes in the real haptic sensors are observed by the real user 102. In some embodiments, the method flows to operation 408 where the operation is configured to perform translation mapping and to perform digital to analog audio conversion. In one embodiment, operation 408 can perform translation mapping which includes determining the respective magnitudes to apply to each haptic sensor (e.g., HS1-HSN) of the headset of 104 the user 102. As noted above, operation 406 is configured to perform vector tracing from the audio objects in the scene to each of the virtual haptic sensors of the virtual headset of the user character 102'. Using the results from vector tracing, operation 408 can determine the respective magnitudes to apply to each haptic sensor (e.g., HS1-HSN) of the headset of 104. In one embodiment, when calculating the magnitude to apply to each haptic sensor (e.g., HS1-HSN), the magnitude may be based on a directional distance of each of the virtual haptic sensor of the virtual headset to the audio object in the scene. In other embodiments, when a scene in a video game includes more than one audio object, the magnitude takes into account each audio object in the scene. In some embodiments, since the 3D audio data 402 is in a digital format, operation 408 is configured to convert the digital data to an analog, e.g., digital to analog audio conversion. In some embodiments, it may be necessary to convert the digital signal to an analog signal so that the signal can be interpreted by the headset 104.

In another embodiment, the method may further include an operation 410 that is configured to amplify the converted analog signals before it is disturbed to the haptic sensors HS1-HSN of the headset 104. After the digital signal is converted to an analog signal, operation 410 can amplify the signal before it is distributed to the haptic sensors. In some embodiments, the amplifier 410 may serve as an intermediary step between the digital to analog signal conversion and the headset 104. In some embodiments, operation 410 may amplify the respective magnitudes that will be applied to each haptic sensor of the headset. In other embodiments, operation 410 may take into account personal weighting adjustments for a particular user and amplify the respective magnitudes based on the corresponding personal weighting adjustments of the user. For example, a user 102 may have a preference of having a larger haptic vibration intensity applied to the haptic sensors along the headband portion of a headset relative to the left and right ear pads. In some cases, the increased intensity can be reflected by increased magnitude in vibration and/or increased frequency vibrations. Accordingly, when amplifying the respective magnitudes for the haptic sensors, operation 410 may be configured to apply a personal weighting adjustment factor to the haptic sensors along the headband portion of a headset so that the haptic sensors along the headband portion of the headset has a larger haptic vibration intensity than the left and right ear pads.

In some embodiments, the method flows to operation 412 and operation 414 where the operations are configured to distribute the amplified magnitudes and to apply the magnitudes to the respective haptic sensors HS1-HSN on the headset 104, respectively. In one embodiment, operation 412 can be configured to process the amplified magnitudes and distribute it to the appropriate haptic sensors. Upon receiving the amplified magnitudes, operation 414 can be configured to apply the magnitudes to the corresponding haptic sensor. Accordingly, when the amplified magnitudes are applied to the haptic sensors during the gameplay of the user, haptic vibrations may occur along the haptic sensors of the headset resulting in an augmented user perception of the video game.

In accordance with another embodiment, a signal may be applied to each of the plurality of haptic sensors of the headset when activating the plurality of haptic sensors. In one embodiment, the signal may be a combination of the audio data from the video game and a specified magnitude value. In one embodiment, the audio data may correspond to the audio objects in the scene of the video game. In other embodiments, the audio data may correspond to the audio objects in the scene of the video game which have been optimized so that the haptic sensors vibrate at optimal levels. In other embodiments, the audio data may correspond to various game parameters in the video game.

FIG. 5 shows a conceptual illustration of an additional embodiment of a method for activating a plurality of haptic sensors HS1-HSN of a headset 104 of a user 102 using audio data from a scene of a video game. In one example, the method includes operation 502 that is configured to monitor and detect sound components associated with audio objects in a scene of a video game. For example, a user 102 may be playing a video game that includes a scene of the user approaching a warzone to fight enemy soldiers. The scene may include a plurality of audio objects that can produce corresponding sound components, e.g., guns firing, grenades exploding, helicopters flying, soldiers shouting, etc.

In another embodiment, the method flows to operation 402 where the operation is configured to determine the three-dimensional (3D) coordinates of the audio objects that appear in the scene of the video game. As the sound components associated with the audio objects are detected in the scene, operation 402 can determine the 3D coordinates of each of the audio objects. Accordingly, operation 402 can track and determine the 3D coordinates of the audio objects at any point in time as the audio objects in the video game changes position during the gameplay.

In another embodiment, the method flows to operation 406 where the operation is configured to determine the position and orientation of the user character 102' and to perform vector tracing from the audio objects in the video game scene to each of the virtual haptic sensors of a virtual headset of the user character 102'. In one embodiment, operation 406 can associate a virtual headset to a head of the user character 102'. Since the 3D coordinates of the audio objects and position and orientation of the user character 102' are known, vector tracing can be performed. In one embodiment, vector tracing includes tracing the sound vectors of the audio objects to the corresponding virtual haptic sensors of the virtual headset.

In another embodiment, the method flows to haptic sensor processor 504 which is configured to determine the respective magnitudes to apply to each haptic sensor (e.g., HS1-HSN) of the headset of 104 the user 102 and to process the data for optimization. After vector tracing is performed by operation 406, the haptic sensor processor 504 can determine the respective magnitudes to apply to each haptic sensor (e.g., HS1-HSN) of the headset of 104. Vector tracing can provide data related to the directional distance of each virtual haptic sensor of the virtual headset to the audio object in the scene which in turn can be used to determine the respective magnitudes. In one embodiment, a shorter directional distance may result in a larger magnitude being applied to the haptic sensor of the headset 104 of the user. Conversely, a longer directional distance may result in a smaller magnitude being applied to the haptic sensor of the headset 104 of the user.

In some embodiments, the haptic sensor processor 504 can be configured to process the respective magnitudes to optimize the data. In one embodiment, the haptic sensor processor 504 can be configured to convert the respective signals from digital to analog so that it can be received by the headset 104. In another embodiment, the haptic sensor processor 504 can be configured to amplify the signal before it is distributed to the haptic sensors. In yet another embodiment, the haptic sensor processor 504 can be configured to equalize the signal for optimization, e.g., tuning the signal so that the motors that drive the haptic sensors perform at an optimal level. Accordingly, after optimization of the data by the haptic sensor processor 504, the method flows to operation 412 and operation 414 where the operations are configured to distribute the amplified magnitudes and to apply the magnitudes to the respective haptic sensors of the headset 104, respectively. In one embodiment, operation 412 can be configured to process the amplified magnitudes and distribute it to the appropriate haptic sensors. At operation 414, the operation is configured to apply the magnitudes to the haptic sensors. As a result, the magnitudes applied at the haptic sensors may cause the haptic sensors to vibrate at an intensity based on the respective magnitudes.

FIGS. 6A and 6B show conceptual illustrations of an embodiment showing the relationship between audio object A and a virtual headset 104' of a character user 102' during vector tracing. In particular, FIGS. 6A and 6B illustrate a rear view and a top view of audio object A and virtual headset 104', respectively. In one example, as shown in FIG. 6A, the virtual headset 104' includes a plurality of virtual haptic sensors HS1'-HS7' that are placed at various locations along the virtual headset 104'. The left ear pad 204a includes virtual haptic sensors HS1'-HS2', the headband section 202 includes HS3'-HS5', and the right ear pad 204b includes virtual haptic sensors HS6'-HS7'. As noted above, the virtual headset 104' and its virtual haptic sensors are virtual representations of the headset 104 and its haptic sensors that is used by the user 102 during the gameplay.

As further shown in FIG. 6A, when an audio object produces a sound component, the sound component may have a corresponding sound intensity level. The sound intensity level is associated with the loudness of the sound perceived by a person. For example, referring to FIG. 6A, audio object A may represent a sound produced by a firearm and its corresponding sound component may have a sound intensity value of approximately 85 dB. The sound intensity value discussed herein is only by way of example, as the intensity may vary depending on the content. As shown, the sound component may be represented by sound vectors $V_{A1}$-$V_{A7}$ pointing in the direction of the virtual haptic sensors, e.g., HS1'-HS7'. In some embodiments, each sound vector may be defined by a magnitude and direction, and the magnitude and direction of the sound vectors can be used to determine the respective magnitudes to apply to the haptic sensors. In one embodiment, the magnitude of a sound vector is associated with the sound intensity level of its corresponding audio object. For example, an audio object that produces a sound component having a large sound intensity level may generally result in its sound vectors having a large magnitude.

In some embodiments, the total number of sound vectors correlates with the total number of virtual haptic sensors of the virtual headset 104' (e.g., 7 sound vectors and 7 virtual haptic sensors). Accordingly, during vector tracing, each sound vector is traced to a corresponding virtual haptic sensor. For example, as illustrated in FIG. 6A, sound vector $V_{A1}$ is traced to virtual haptic sensor HS1', sound vector $V_{A2}$ is traced to virtual haptic sensor HS2', sound vector $V_{A3}$ is traced to virtual haptic sensor HS3', sound vector $V_{A4}$ is traced to virtual haptic sensor HS4', sound vector $V_{A5}$ is traced to virtual haptic sensor HS5', sound vector $V_{A6}$ is traced to virtual haptic sensor HS6', and sound vector $V_{A7}$ is traced to virtual haptic sensor HS7'. As a result, the directional distance of each haptic sensor to the audio object can be determined.

In one embodiment, the sound vectors $V_{A1}$-$V_{A7}$ illustrate the directional distance between each virtual haptic sensor of the virtual headset and the audio object in the scene. As noted above, the magnitude that is applied to the haptic sensors HS1-HSN of the headset 104 is based on the directional distance between each virtual haptic sensor of the virtual headset and the audio object in the scene. For example, referring to FIG. 6A, sound vector $V_{A6}$ has a shorter directional distance compared to sound vector $V_{A1}$ since the distance from audio object A to the virtual haptic sensor HS6' is less than the distance from audio object A to the virtual haptic sensor HS1'. Accordingly, since audio object A is closer to virtual haptic sensor HS6', a larger magnitude is applied to haptic sensor HS6, which in turn can result in a larger haptic vibration occurring at HS6. In other words, a shorter directional distance may result in a larger magnitude being applied to the haptic sensor. Conversely, a longer directional distance may result in a smaller magnitude being applied to the haptic sensor.

In another embodiment, the magnitude that is applied to the haptic sensors HS1-HSN of the headset 104 is based on the magnitude of the sound vectors. As noted above, the magnitude of a sound vector of an audio object is associated with the sound intensity level of the audio object. Generally, audio objects with a larger sound intensity levels may result in a larger sound vector which in turn can result in a larger magnitude being applied to the haptic sensors.

Referring to FIG. 6B, the figure illustrates a top view of the virtual headset 104' and the audio object A during vector tracing. As shown, the figure illustrates the headset 104' and its corresponding virtual haptic sensors HS1'-HS7', and audio object A and its corresponding sound vectors $V_{A1}$-$V_{A7}$. In the illustrated example, sound vector $V_{A1}$ is traced to virtual haptic sensor HS1', sound vector $V_{A2}$ is traced to virtual haptic sensor HS2', sound vector $V_{A3}$ is traced to virtual haptic sensor HS3', sound vector $V_{A4}$ is traced to virtual haptic sensor HS4', sound vector $V_{A5}$ is traced to virtual haptic sensor HS5', sound vector $V_{A6}$ is traced to virtual haptic sensor HS6', and sound vector $V_{A7}$ is traced to virtual haptic sensor HS7'.

FIGS. 7A-7C show conceptual illustrations of an embodiment showing the relationship between a plurality of audio objects and a virtual headset 104' during vector tracing at various points in time. In one embodiment, each of the audio objects (e.g., audio objects A-F) in FIGS. 7A-7C may have a corresponding sound intensity level which can be used to determine the magnitudes that are applied to each haptic sensor of the headset 104. As shown in FIG. 7A, the figure illustrates a rear view of the virtual headset 104' and audio objects A and B at time t1. During the gameplay of the user 102, as the user character 102' moves throughout the game, the virtual headset 104' also moves along with the user character 102'. Accordingly, at any point in time, the virtual headset 104' can be oriented in a variety of positions and angles. As shown in FIG. 7A, at time t1, the virtual headset 104' forms an angle 702. In particular, the angle 702 is the angle formed between reference line 704 and a virtual headset reference line 706. As further illustrated, the virtual headset 104' includes a plurality of virtual haptic sensors HS1'-HS7' located at various locations along the virtual headset 104'.

FIG. 7A further illustrates audio objects A and B in the scene of the video game. In one embodiment, audio objects A and B may have different sound intensity levels. For example, depending on the distance to the user character, audio object A may represent a jet airplane flying in the air which can produce a sound with a sound intensity level of approximately 100 dB. Audio object B may represent a person yelling which can produce a sound with a sound intensity level of approximately 80 db. As shown, sound vectors $V_{A1}$-$V_{A7}$ and $V_{B1}$-$V_{B7}$ correspond to the sound components associated with audio objects A and B, respectively. Sound vectors $V_{A1}$-$V_{A7}$ and $V_{B1}$-$V_{B7}$ are shown pointing in the direction of the virtual haptic sensors HS1'-HS7'. As shown, the sound vectors $V_{A1}$-$V_{A7}$ that are associated with audio object A are traced to virtual haptic sensors HS1'-HS7', respectively. Further, the sound vectors $V_{B1}$-$V_{B7}$ that are associated with audio object B are traced to virtual haptic sensors HS1'-HS7', respectively. In this example, audio objects A and B may both contribute to the magnitude that is applied to the haptic sensors of the headset 104.

As noted above, each sound vector may be defined by a magnitude and direction, and the sound vectors can be used to determine the respective magnitude to apply to the haptic sensors of the headset 104. When determining the respective magnitude to apply to the virtual haptic sensors, the magnitudes are based on a directional distance of each virtual haptic sensor to each audio object in the scene. For example, during vector tracing, sound vectors $V_{A5}$ and $V_{B5}$ are traced to virtual haptic HS5', and the directional distance of sound vectors $V_{A5}$ and $V_{B5}$ can be determined. Accordingly, when calculating the magnitude to apply to haptic sensor HS5, the directional distance of sound vectors $V_{A5}$ and $V_{B5}$ along with their corresponding magnitudes can be used to determine the magnitude to apply to the haptic sensor HS5 of the headset 104.

FIG. 7B illustrates the position and orientation of the virtual headset 104' and audio objects C and D at time t2 during vectoring tracing. As shown, the reference line 704 and the virtual headset reference line 706 are substantially aligned with respect to each other. As a result, the virtual headset 104' forms an angle 702 that is nominal. In one embodiment, audio object C may have a larger sound intensity level than audio object D. As shown, sound vectors $V_{C1}$-$V_{C7}$ and $V_{D1}$-$V_{D7}$ correspond to the sound components associated with audio objects C and D, respectively. Sound vectors $V_{C1}$-$V_{C7}$ and $V_{D1}$-$V_{D7}$ are shown pointing in the direction of the virtual haptic sensors HS1'-HS7'. As shown, the sound vectors $V_{C1}$-$V_{C7}$ that are associated with audio object C are traced to virtual haptic sensors HS1'-HS7', respectively. Further, the sound vectors $V_{D1}$-$V_{D7}$ that are associated with audio object D are traced to virtual haptic sensors HS1'-HS7', respectively.

FIG. 7C illustrates the position and orientation of the virtual headset 104' and audio objects E-G at time to during vector tracing. As shown, the virtual headset 104' forms an angle 702. In particular, angle 702 is the angle formed between the reference line 704 and the virtual headset reference line 706. In one embodiment, the audio object audio objects E-G and may each have the same or a different sound intensity level. In one example, audio object F may have a larger sound intensity level than audio objects E and G. As further illustrated, sound vectors $V_{E1}$-$V_{E7}$, $V_{F1}$-$V_{F7}$, and $V_{G1}$-$V_{G7}$ represent the sound components produced by their corresponding audio objects E-F, respectively. Sound vectors $V_{E1}$-$V_{E7}$, $V_{F1}$-$V_{F7}$, and $V_{G1}$-$V_{G7}$ are shown pointing in the direction of the virtual haptic sensors HS1'-HS7'. As shown, the sound vectors $V_{E1}$-$V_{E7}$ are traced to virtual haptic sensors HS1'-HS7', sound vectors $V_{F1}$-$V_{F7}$ are traced to virtual haptic sensors HS1'-HS7', and sound vectors $V_{G1}$-$V_{G7}$ are traced to virtual haptic sensors HS1'-HS7'.

In other embodiments, as noted above, the scene of the video game may include a plurality of audio objects. The magnitude that is applied to each of the plurality of haptic sensors can be proportionally adjusted for sound components occurring at about a same time. For example, referring to FIG. 7C, the scene includes audio objects E-F which produces a corresponding sound component at approximately the same time, e.g., time tn. When determining the magnitude to apply to each of the plurality of haptic sensors, the magnitude is proportionally adjusted for the sound components (e.g., $V_{E1}$-$V_{E7}$, $V_{F1}$-$V_{F7}$, and $V_{G1}$-$V_{G7}$) occurring at about the same time.

Figure 8:
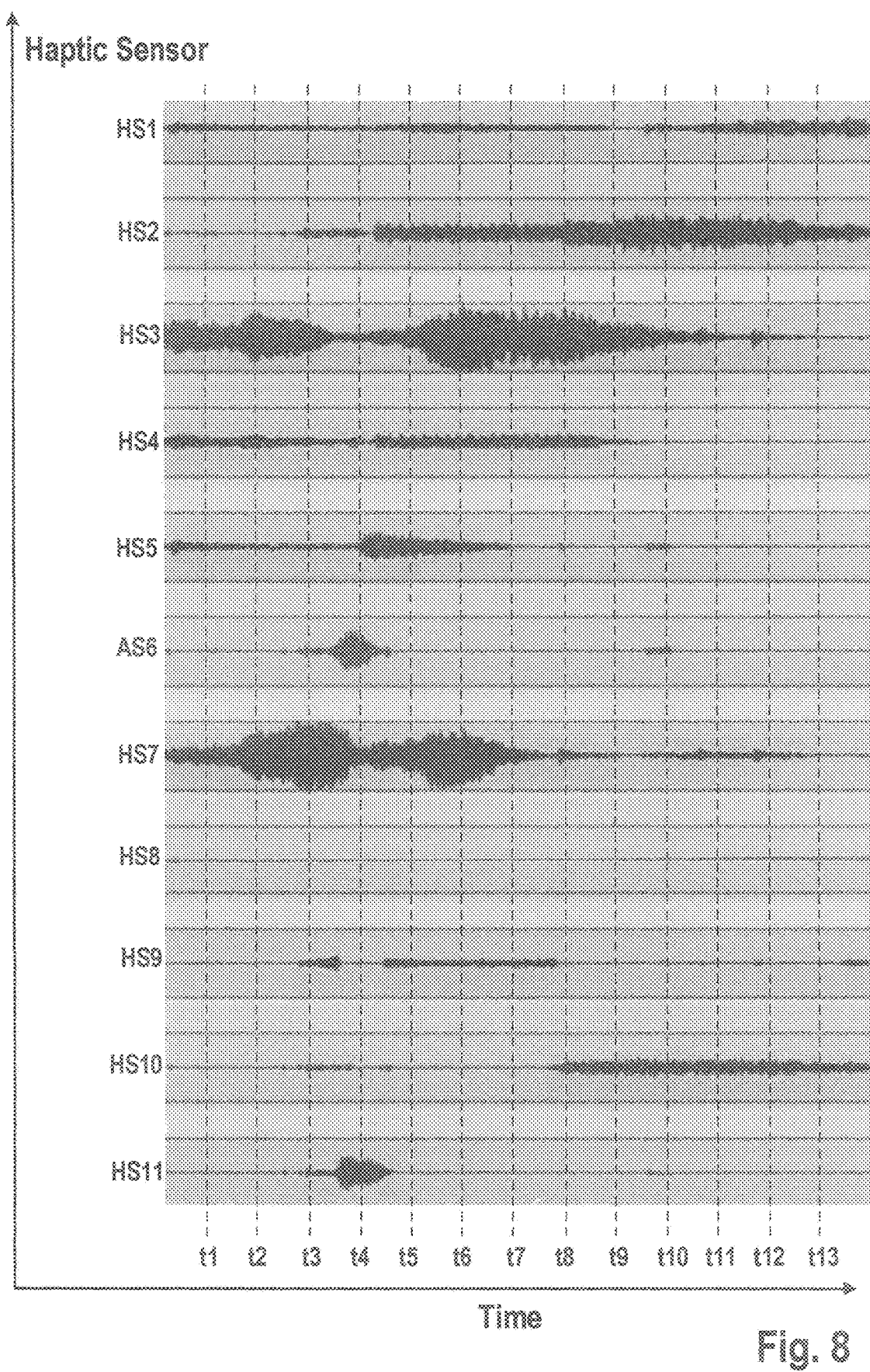
FIG. 8 illustrates an exemplary graph of the signals that are distributed to the haptic sensors of the headset of the user, in accordance with an implementation of the disclosure.

FIG. 8 illustrates an exemplary graph of the signals that are distributed to the haptic sensors HS1-HS11 of the headset 104 of the user 102. As shown in the illustration, the graph includes signals for HS1-HS11 over a time period, e.g., t1-t13. For each haptic sensor, the signal may have a magnitude that ranges from 0-10. In one embodiment, the magnitude applied at each haptic sensor is determined based on the directional distance of each virtual haptic sensor of the virtual headset to the audio objects in the scene. In another embodiment, the magnitude applied at each haptic sensor is determined based on the magnitude of the sound vectors of the audio objects. As noted above, generally, a sound vector with a shorter directional distance may result in a larger magnitude being applied to the haptic sensor of the headset. Conversely, sound vector having a longer directional distance may result in a smaller magnitude being applied to the haptic sensor of the headset. In other embodiments, the magnitudes applied at the haptic sensors may be based on the sound intensity level associated with the audio objects. For example, an audio object having a larger sound intensity level relative to the other audio objects in the scene may result in its corresponding sound vectors have a larger magnitude relative to the other sound vectors in the scene. In turn, sound vectors with larger magnitudes may result in a larger magnitude being applied to the haptic sensors.

FIG. 9 illustrates an embodiment of a haptic sensor magnitude table 902 which includes the respective magnitudes that are applied to each of the haptic sensors HS1-HS11 of a headset 104 of a user 102 during the gameplay of the user. As shown, the haptic sensor table magnitude 902 includes a haptic sensor identification 904 and the magnitudes 906 applied to each haptic sensor over a period of time, e.g., t1-t13. In some embodiments, the haptic sensor table magnitude 902 includes a personal weighting adjustment 908 which can be used to adjust the magnitudes based on the preferences of the user. As noted above, as the user plays a video game and controls the user character 102' in the game, the position and orientation of the user character 102' is constantly changing and different audio objects may appear in the game. This may result in the magnitudes 906 constantly changing throughout the progression of the video game.

As illustrated in FIG. 9, each haptic sensor HS1-HS11 shows the magnitudes that are applied to the haptic sensors over a period of time, e.g., time t1-t13. In one embodiment, the magnitude applied to the haptic sensors can range from 0-10. In some embodiments, applying a magnitude having a value of '10' to a haptic sensor may cause haptic vibrations that occur at a maximum intensity. Conversely, applying a magnitude having a value of '0' to a haptic sensor may not in any haptic vibrations. In one example, the magnitude for haptic sensor HS1 ranges between a minimum value of 0.32 and a maximum value of 3.57. In another example, the magnitude for haptic sensor HS7 ranges between a minimum value of 0.23 and a maximum value of 9.67.

As further illustrated in FIG. 9, the haptic sensor table magnitude 902 may include a personal weighting adjustment 908. The personal weighting adjustment 908 can be used to adjust the haptic sensor magnitudes 906 based on the preferences of the user. As illustrated in the example in FIG. 9, the personal weighting adjustment 908 includes three different settings for the user, e.g., settings 1-3. The setting values may range between 0-2. If a user 102 has a desire to apply the personal weighting adjustment 908 to the magnitudes, the haptic sensor magnitudes 902 can be adjusted by multiplying the respective magnitudes by the corresponding setting values to determine the adjusted haptic sensor magnitudes.

For example, as illustrated in FIG. 9, setting 1 has a setting value of '1' for haptic sensors HS1-HS4, a setting value of '0' for haptic sensors HS5-HS7, and a setting value of '0.5' for haptic sensors HS8-HS11. Applying a setting value of '1' results in the adjusted haptic sensor magnitude being the same. Applying a setting value of '0' results in the adjusted haptic sensor magnitude having a value of '0'. Applying a setting value of '0.5' results in the adjusted haptic sensor magnitude being reduced by half. As a result, no changes are applied to haptic sensors HS1-HS4 and the haptic vibrations will remain the same at HS1-HS4. However, at haptic sensors HS5-HS7, the haptic vibrations will be turned off, and at HS8-HS11, the haptic vibrations will be reduced by half.

In some embodiments, personal weighting adjustment 908 and the various settings can be determined based on a profile of the user and the user's historical behavior. For example, if the user tends to manually adjust their settings so that the magnitudes of the haptic sensors are reduced by 50%, the system can dynamically adjust the magnitudes by 50% during the user's subsequent gameplay sessions. In other embodiments, the personal weighting adjustment 908 can be predicted using a machine learning algorithm that ingest the user's previous gameplay data, the profile of the user, and any feedback provided by the user to determined various personal weighting adjustments that may be of interest to the user.

Figure 10:
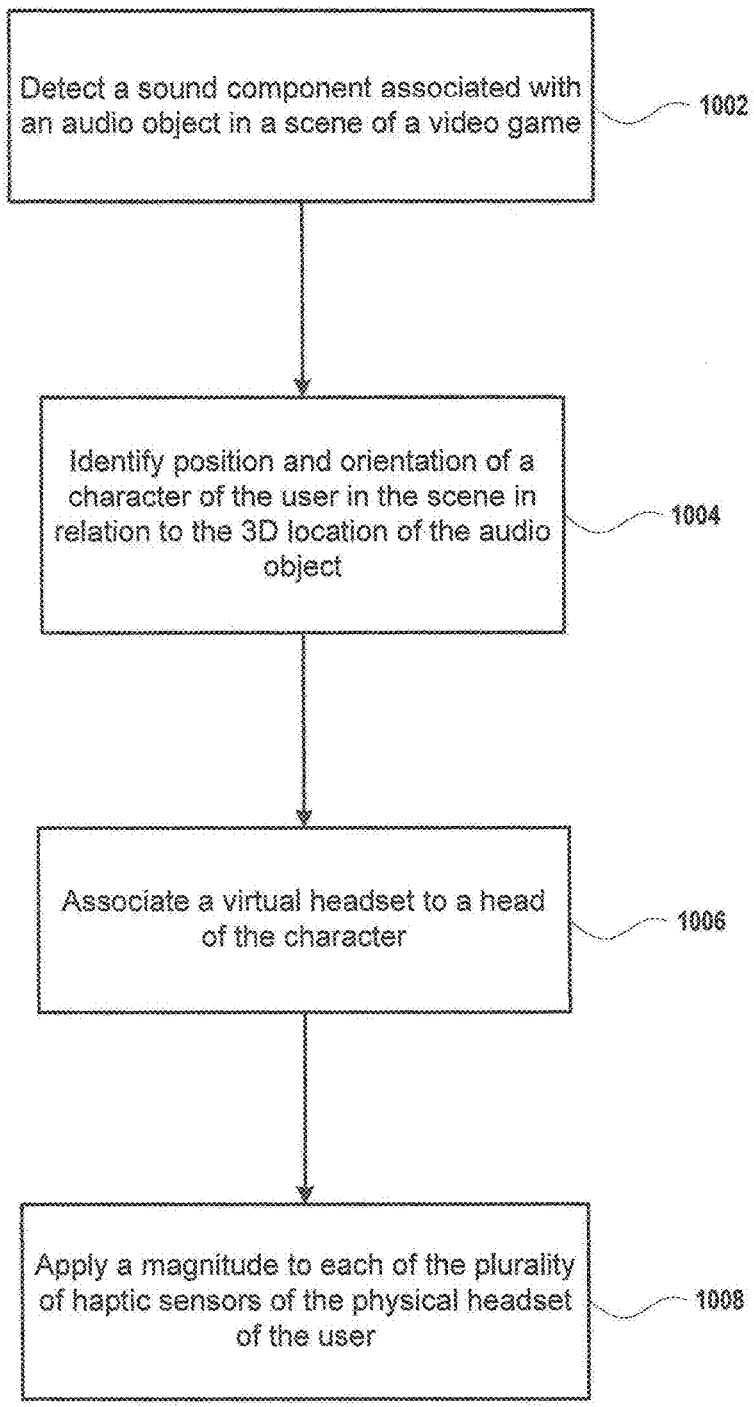
FIG. 10 illustrates a method for activating a plurality of haptic sensors of a headset of a user playing a video game, in accordance with an implementation of the disclosure.

FIG. 10 illustrates a method for activating a plurality of haptic sensors HS1-HSN of a headset 104 of a user 102 playing a video game. In one embodiment, the method includes an operation 1002 that is configured to detect a sound component associated with an audio object in a scene of the video game. For example, the audio object can be game character or an object in the game that can produce a sound component. The sound component of an audio object may have a specified sound intensity level. In general, the sound intensity level is associated with the loudness of the sound that can be perceived by a person. In other embodiments, the audio object has three-dimensional (3D) location data. When one or more audio objects appear in a scene of a video game, operation 1002 is configured to detect the sound components associated with the audio objects and can also be configured to determine its 3D coordinates and sound intensity level.

The method shown in FIG. 10 then flows to operation 1004 where the operation is configured to identify the position and orientation of the user character 102' in the scene in relation to the 3D location of the audio object. As noted above, during the gameplay of the user 102, the user 102 controls the movements and actions of the user character 102'. As the position and orientation of the user character 102' constantly changes throughout the progression of the gameplay, operation 1004 dynamically tracks and monitors each movement the user character 102' makes and its location can be determined at any point in time.

The method flows to operation 1006 where the operation is configured to associate a virtual headset 104' to a head of the user character 102'. The virtual headset 104' may include a plurality of virtual haptic sensors dispersed at various locations of the virtual headset. As noted above, the virtual headset 104' and the plurality of virtual haptic sensors HS1'-HSN' are virtual representations of the headset 104 and its corresponding haptic sensors HS1-HSN. Accordingly, when a magnitude is applied to the virtual haptic sensors HS1'-HSN', the same magnitude is also applied to the corresponding haptic sensors HS1-HSN on the headset 104. In some embodiments, since the position and orientation of the user character 102' is constantly changing, the virtual headset 104' also moves along with the user character 102' in the scene.

The method shown in FIG. 10 then flows to operation 1008 where the operation is configured to apply a magnitude to each of the plurality of haptic sensors HS1-HSN of the headset 104 of the user 102. In some embodiments, the magnitude that is applied to the plurality of haptic sensors HS1-HSN is generated using vector tracing. As noted above, vector tracing involves tracing the sound vectors of an audio object to the corresponding virtual haptic sensors HS1'-

HSN' of the virtual headset 104'. Since each sound vector includes a magnitude, direction, and distance, these parameters may be used to determine the respective magnitudes to apply to the haptic sensors HS1-HSN. For example, a shorter directional distance may result in a larger magnitude being applied to the haptic sensor. Conversely, a longer directional distance may result in a smaller magnitude being applied to the haptic sensor.

Figure 11:
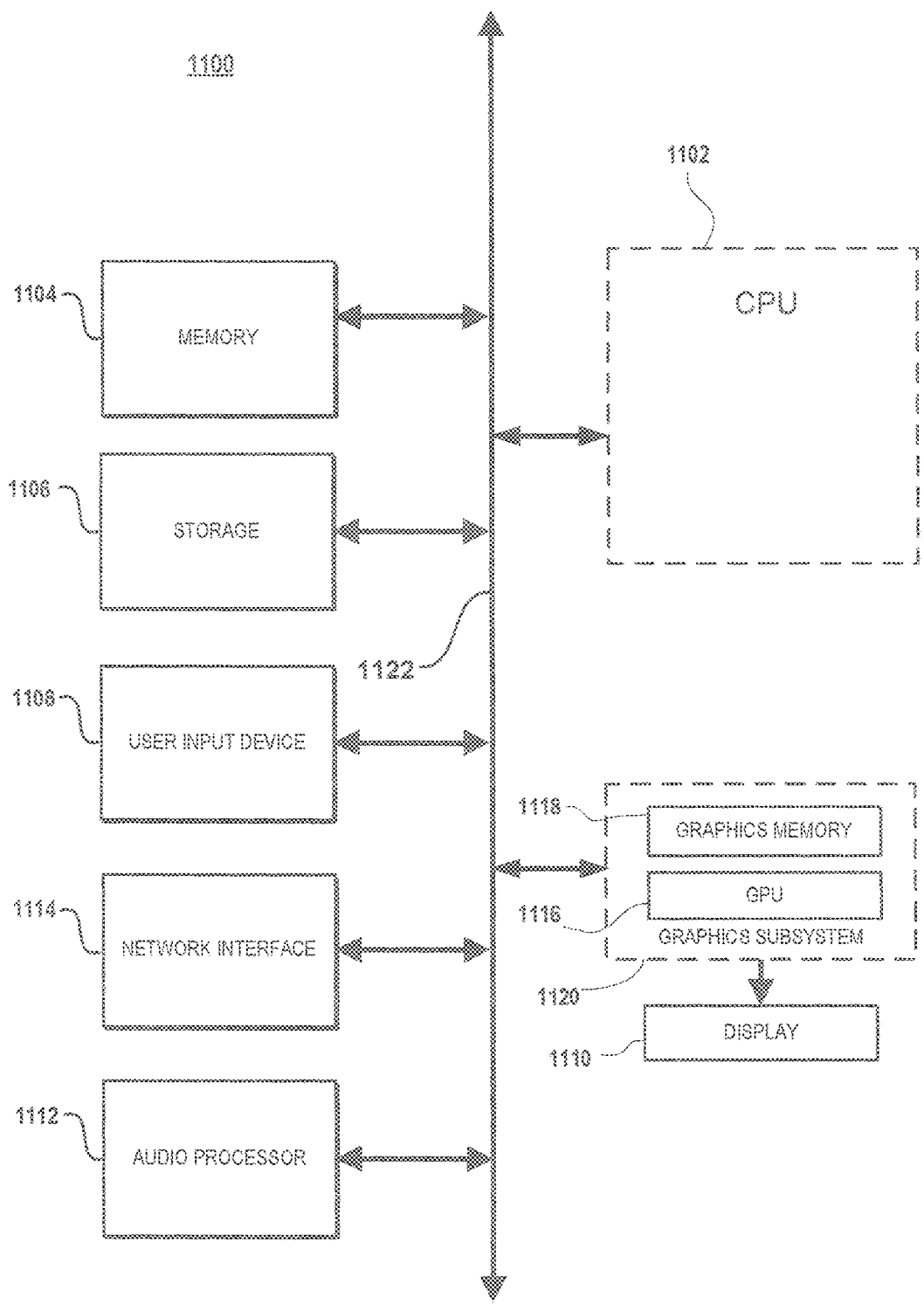
FIG. 11 illustrates components of an example device that can be used to perform aspects of the various embodiments of the present disclosure.

FIG. 11 illustrates components of an example device 1100 that can be used to perform aspects of the various embodiments of the present disclosure. This block diagram illustrates a device 1100 that can incorporate or can be a personal computer, video game console, personal digital assistant, a server or other digital device, suitable for practicing an embodiment of the disclosure. Device 1100 includes a central processing unit (CPU) 1102 for running software applications and optionally an operating system. CPU 1102 may be comprised of one or more homogeneous or heterogeneous processing cores. For example, CPU 1102 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 1100 may be a localized to a player playing a game segment (e.g., game console), or remote from the player (e.g., back-end server processor), or one of many servers using virtualization in a game cloud system for remote streaming of gameplay to clients.

Memory 1104 stores applications and data for use by the CPU 1102. Storage 1106 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 1108 communicate user inputs from one or more users to device 1100, examples of which may include keyboards, mice, joysticks, touch pads, touch screens, still or video recorders/cameras, tracking devices for recognizing gestures, and/or microphones. Network interface 1114 allows device 1100 to communicate with other computer systems via an electronic communications network, and may include wired or wireless communication over local area networks and wide area networks such as the internet. An audio processor 1112 is adapted to generate analog or digital audio output from instructions and/or data provided by the CPU 1102, memory 1104, and/or storage 1106. The components of device 1100, including CPU 1102, memory 1104, data storage 1106, user input devices 1108, network interface 1110, and audio processor 1112 are connected via one or more data buses 1122.

A graphics subsystem 1120 is further connected with data bus 1122 and the components of the device 1100. The graphics subsystem 1120 includes a graphics processing unit (GPU) 1116 and graphics memory 1118. Graphics memory 1118 includes a display memory (e.g., a frame buffer) used for storing pixel data for each pixel of an output image. Graphics memory 1118 can be integrated in the same device as GPU 1108, connected as a separate device with GPU 1116, and/or implemented within memory 1104. Pixel data can be provided to graphics memory 1118 directly from the CPU 1102. Alternatively, CPU 1102 provides the GPU 1116 with data and/or instructions defining the desired output images, from which the GPU 1116 generates the pixel data of one or more output images. The data and/or instructions defining the desired output images can be stored in memory 1104 and/or graphics memory 1118. In an embodiment, the GPU 1116 includes 3D rendering capabilities for generating pixel data for output images from instructions and data defining the geometry, lighting, shading, texturing, motion, and/or camera parameters for a scene. The GPU 1116 can further include one or more programmable execution units capable of executing shader programs.

The graphics subsystem 1114 periodically outputs pixel data for an image from graphics memory 1118 to be displayed on display device 1110. Display device 1110 can be any device capable of displaying visual information in response to a signal from the device 1100, including CRT, LCD, plasma, and OLED displays. Device 1100 can provide the display device 1110 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a processing entity associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet.

It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g. prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g. accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g. accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g. feedback data) from the client device or directly from the cloud gaming server.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method for activating a plurality of haptic sensors of a physical headset of a user playing a video game, comprising:
   detecting a sound component associated with an audio object in a scene of the video game, the audio object having a three-dimensional (3D) location in the scene;
   identifying position and orientation of a character of the user in the scene in relation to the 3D location of the audio object, the character of the user being controlled by the user playing the video game;
   associating a virtual headset to a head of the character, the virtual headset moving as the position and orientation of the character moves in the scene, the virtual headset including a plurality of virtual haptic sensors; and
   applying a magnitude to each of the plurality of haptic sensors of the physical headset based on a directional distance of each of the virtual haptic sensors of the virtual headset to the audio object in the scene.

2. The method of claim 1, wherein the magnitude of each of the plurality of haptic sensors is generated using vector tracing from the audio object in the scene to each of the virtual haptic sensors of the virtual headset.

3. The method of claim 2, wherein the vector tracing includes tracing sound vectors of the audio object directionally to the virtual haptic sensors of the virtual headset.

4. The method of claim 1, wherein the magnitude applied to each of the plurality of haptic sensors is further based on a magnitude of a sound vector of the audio object, said magnitude of the sound vector corresponds to a sound intensity level of the audio object.

5. The method of claim 4, wherein the magnitude of the sound vector is increased when a distance between the audio object and the respective virtual haptic sensors decreases and decreases when a distance between the audio object and the respective virtual haptic sensor increases.

6. The method of claim 1, wherein the sound component associated with the audio object is defined by a plurality of sound vectors that are pointed toward a direction of each of the plurality of virtual haptic sensors of the virtual headset.

7. The method of claim 6, wherein the plurality of sound vectors includes a corresponding magnitude and a corresponding direction that are used to define the magnitude to apply to of each of the plurality of haptic sensors based on the position and orientation of the virtual haptic sensors.

8. The method of claim 1, wherein the audio object in the scene of the video game includes a corresponding sound intensity level that is used to partially determine the magnitude to apply to each of the plurality of haptic sensors of the physical headset.

9. The method of claim 1, wherein the position and orientation of the character of the user in the scene in relation to the 3D location of the audio object is dynamically updated at intervals of progression of the video game.

10. The method of claim 1, wherein applying the magnitude to each of the plurality of haptic sensors of the physical headset causes haptic vibrations at each of the plurality of haptic sensors that are responsive to the sound component of the audio object in the scene of the video game.

11. The method of claim 1, wherein the magnitude applied to each of the plurality of haptic sensors is further based on a personal weighting adjustment of the user.

12. The method of claim 1, wherein audio object in the scene of the video game is one of a plurality of audio objects, and said magnitude of each of the plurality of haptic sensors is proportionally adjusted for sound components occurring at about a same time, and each of said plurality of haptic sensors is controlled to a specific frequency of operation corresponding to said respective magnitude of each of the plurality of haptic sensors.

13. A headset for a user when playing a video game, comprising,
   a left ear portion;
   a right ear portion, wherein each of the left and right ear portions include an audio output section and a surround section;
   a plurality of haptic sensors disposed around each of the surround sections of the left ear portion and the right ear portion;
   a left ear pad covering the first plurality of haptic sensors and a right ear pad covering the second plurality of haptic sensors;
   a controller connected to each of the plurality of haptic sensors, the controller is configured to receive control data to be sent to each of the plurality of haptic sensors for setting a magnitude output by each of the plurality of haptic sensors, the magnitude set by,
      detecting a sound component associated with an audio object in a scene of the video game, the audio object having a three-dimensional (3D) location in the scene;
      identifying position and orientation of a character of the user in the scene in relation to the 3D location of the audio object, the character of the user being controlled by the user playing the video game;
      associating a virtual headset to a head of the character, the virtual headset moving as the position and orientation of the character moves in the scene, the virtual headset including the plurality of virtual haptic sensors; and
      applying the magnitude to each of the plurality of haptic sensors of the headset based on a directional distance of each of the virtual haptic sensors of the virtual headset to the audio object in the scene.

14. The headset of claim 13, wherein the control data is configured to be updated as changes in occur in position of the audio object or other audio objects produce sound components in the scene of the video game.

15. The headset of claim 13, wherein the magnitude of each of the plurality of haptic sensors changes as the character moves around the scene relative to the audio object and/or plurality of audio objects.

16. The headset of claim 13, wherein the magnitude of each of the plurality of haptic sensors is generated using vector tracing from the audio object in the scene to each of the virtual haptic sensors of the virtual headset.

17. The headset of claim 16, wherein the vector tracing includes tracing sound vectors of the audio object directionally to the virtual haptic sensors of the virtual headset.

18. The headset of claim 13, wherein the magnitude applied to each of the plurality of haptic sensors is further based on a magnitude of a sound vector of the audio object, said magnitude of the sound vector corresponds to a sound intensity level of the audio object, and each of said plurality of haptic sensors is controlled to a specific frequency of operation corresponding to said respective applied magnitude for each of the plurality of haptic sensors.

19. The headset of claim 18, wherein the magnitude of the sound vector is increased when a distance between the audio object and the respective virtual haptic sensors decreases and decreases when a distance between the audio object and the respective virtual haptic sensor increases.

20. The headset of claim 13, wherein the magnitude applied to each of the plurality of haptic sensors is further based on a magnitude of a sound vector of the audio object, said magnitude of the sound vector corresponds to a sound intensity level of the audio object, and the magnitude of the sound vector is increased when a distance between the audio object and the respective virtual haptic sensors decreases and decreases when a distance between the audio object and the respective virtual haptic sensor increases.

21. The headset of claim 13, wherein one or more haptic sensors are disposed on a headband portion of the headset that connects between the left ear portion and the right ear portion.

22. The headset of claim 13, wherein the control data is configured to be updated based on audio data and/or frequency data associated with the audio object.

* * * * *